Patented June 7, 1938

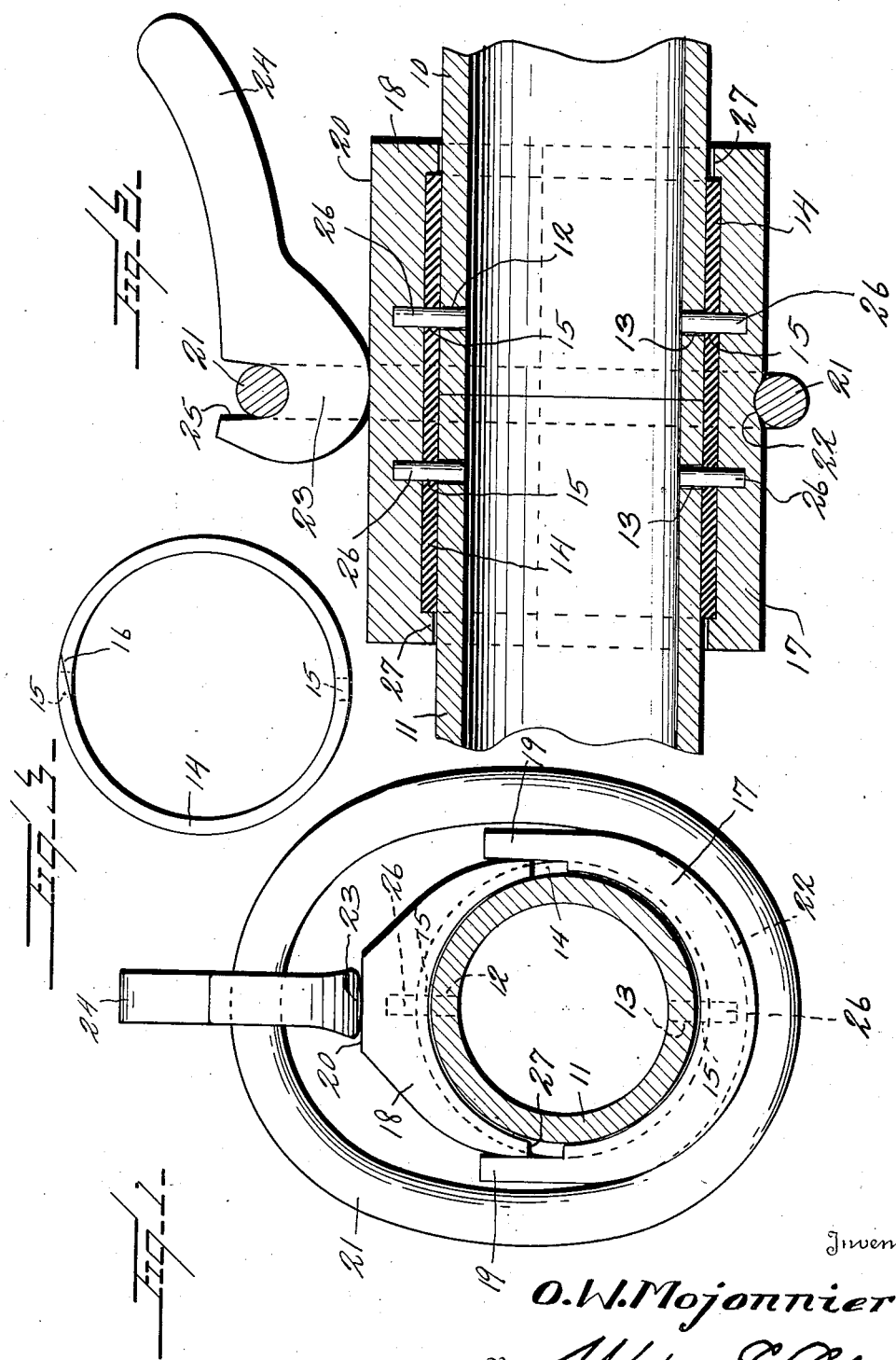

2,120,184

UNITED STATES PATENT OFFICE 2,120,184

PIPE JOINT OR COUPLING

Oliver W. Mojonnier, River Forest, Ill.

Application December 16, 1937, Serial No. 180,190

1 Claim. (Cl. 285—194)

This invention relates to means for coupling together two abutting pipes so as to secure a water-tight joint between them, and the general object of the invention is to provide a relatively simple means to this end which is easily operated, which is cheap and by which the pipes may be readily coupled or uncoupled, and a further object is to provide a coupling which is particularly applicable to metallic pipes.

My invention is illustrated in the accompanying drawing wherein:

Fig. 1 is an end elevation of the coupling, one of the coupled pipes being in section.

Fig. 2 is a longitudinal section of the pipe and coupling with parts in elevation. Fig. 3 is an elevation of the rubber or elastic sleeve which fits around the abutting ends of the two pipes, this figure showing a modification of the sleeve.

Referring to the drawing, 10 and 11 designate two metallic pipes abutted at their ends. Upper and lower bores 12 and 13 are formed in these pipes, these bores extending radially outward in opposite directions. Disposed to surround the adjacent ends of the pipes is a rubber or waterproof elastic sleeve 14, which, in the preferable form of my invention, is solid, that is, is not split. This sleeve is apertured at 15, these apertures being adapted to aline with the bores 12 and 13. The sleeve has, therefore, four apertures.

Disposed above and below the sleeve are the two segmental members 17 and 18. The member 17 has approximately the form of a semi-circle but the ends of its legs extend straight upward at 19. The member 18 has a semi-circular inner face which merges into the inner face of the member 17 and the two members 17 and 18 are in the position shown in Fig. 1, and the member 18 has a flat outer face 20. Embracing the members 17 and 18 is a somewhat oval ring 21, the outer face of the member 18 being formed with a seat 22 for this ring, as shown clearly in Fig. 2. Engaged with that portion of the ring 21 which is disposed opposite the flat face 20 is a cam 23 having a handle 24 and a recess 25 for the reception of the ring 21. Each of the members 17 and 18 is formed with a pair of projecting pins 26 which, when the sleeve 14 and the members 17 and 18 are in proper position with relation to the pipe sections 10 and 11, pass through the apertures 15 and into the bores 12, in the manner shown in Fig. 2, and thus when the handle 24 is pushed down into the position shown in Fig. 2, the cam 23 will force the member 18 in one direction and simultaneously pull upon the ring to force the member 17 in the opposite direction and thus the rubber sleeve 14 will be compressed around the pipe sections 10 and 11 and completely close the joint between these sections. Preferably, the extremities of the members 17 and 18 are formed with the flanges 27 at their ends between which flanges the rubber sleeve 14 fits. These flanges 27 retain the rubber gasket from any endwise movement.

In Fig. 3, I have illustrated a slight modification of the rubber gasket 14 in which this gasket is split instead of being formed of one completely annular piece of material. The ring in Fig. 3 is shown as split at 16, and one of the apertures 15 passes through the overlapping ends of this split in the sleeve. In Figs. 1 and 2, however, the sleeve is solid and not split.

While I have illustrated a particular and very simple form of clamping means whereby the members 17 and 18 may be forced towards each other, I do not wish to be limited to this as other forms of clamping means whereby the elements 17 and 18 may be forced towards each other may be used and any form of clamping yoke with any compressing means may be used in place of the ring and cam. A C-clamp with a thumb screw might be used in place of the ring 21 as a yoke for forcing the two members 17 and 18 towards each other.

It will be seen that the construction which I have provided is very simple, may be quickly applied and quickly removed and that a watertight joint is provided between the pipes 10 and 11, and that these pipes are held in abutting engagement with each other by the pins 26, the sleeve 14 and the compressing members 17 and 18, so that the pipes cannot move longitudinally relative to each other and thus get out of position. When two pipes are to be joined by this coupling, it is an easy matter to bore apertures in the ends of the pipes for the reception of the pins 26. It will likewise be particularly noted that the sleeve 14 is nearly entirely enclosed within the compression members 17 and 18 and held from any movement.

While I have illustrated two compression members 17 and 18, I do not wish to be limited to forming these compression members merely in two parts, as these compression members may be formed in three or more parts for large pipe sizes.

What is claimed is:—

The combination with abutting pipe sections each having radially extending bores adjacent their abutting ends, of a sleeve of compressible material surrounding said abutting ends of the pipe and having apertures registering with said bores, opposed compression members each surrounding half the sleeve and each having inwardly projecting pins adapted to be inserted through said apertures in the sleeve and into said bores, and means associated with the compression members constructed and arranged to urge the compression members towards each other.

OLIVER W. MOJONNIER.